No. 640,666. Patented Jan. 2, 1900.
G. W. KNAPP.
URINAL.
(Application filed Feb. 13, 1899.)
(No Model.)
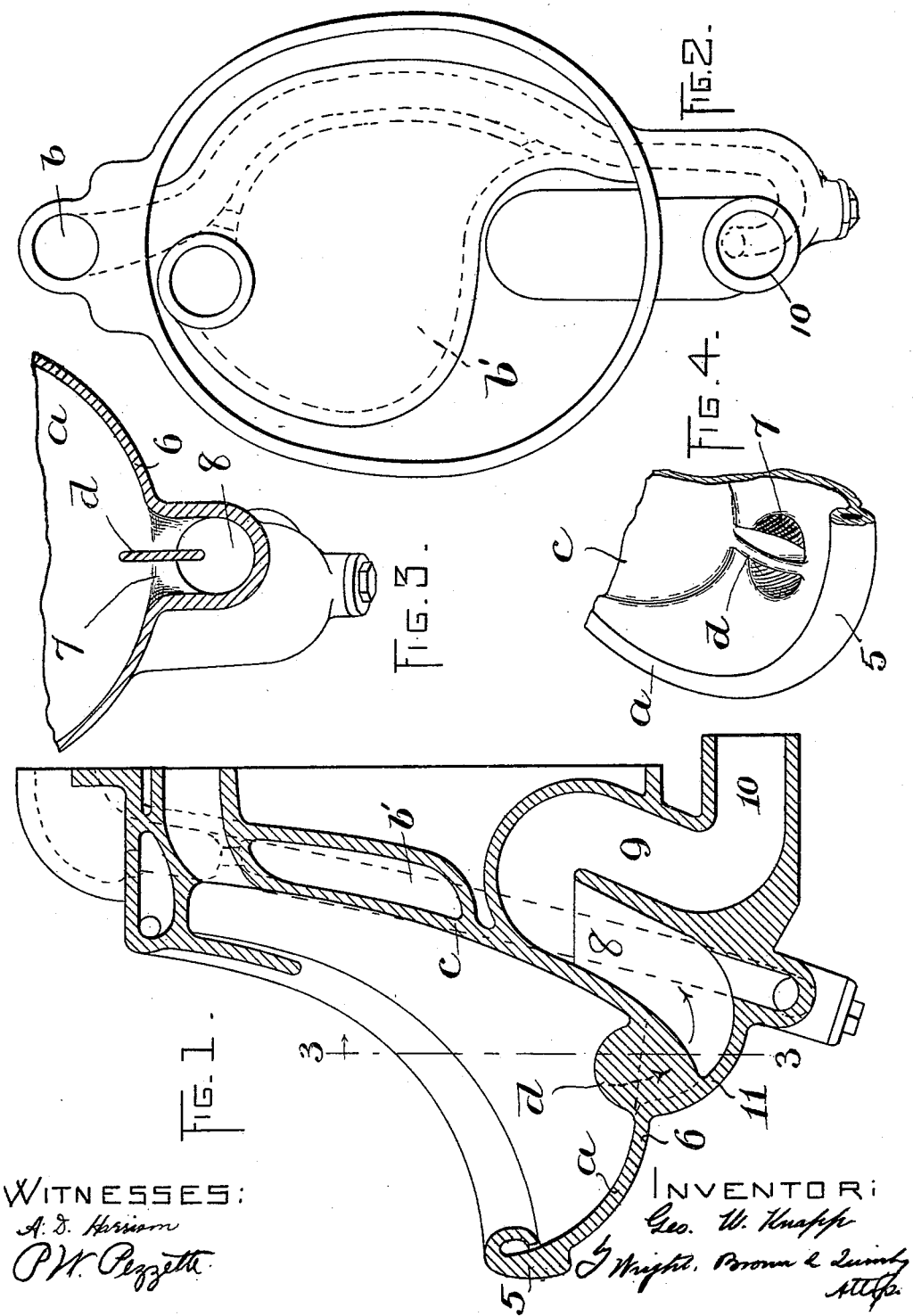
WITNESSES:
A. D. Harrison
P. W. Pezzetti
INVENTOR:
Geo. W. Knapp
Wright, Brown & Quinby
Attys.

UNITED STATES PATENT OFFICE.

GEORGE W. KNAPP, OF STONEHAM, MASSACHUSETTS, ASSIGNOR TO THE SMITH & ANTHONY COMPANY, OF BOSTON, MASSACHUSETTS.

URINAL.

SPECIFICATION forming part of Letters Patent No. 640,666, dated January 2, 1900.

Application filed February 13, 1899. Serial No. 705,367. (No model.)

*To all whom it may concern:*

Be it known that I, GEORGE W. KNAPP, of Stoneham, in the county of Middlesex and State of Massachusetts, have invented certain new and useful Improvements in Urinals, of which the following is a specification.

This invention has relation to urinals, and has for its object to provide certain improvements therein to render them more difficult to clog and overflow. Urinals are as a general rule placed in buildings where they are used by the public generally, and, either through ignorance or wilfulness, foreign or waste matter—such as pieces of paper, orange or banana peels, &c.—are thrown into them, frequently closing the discharge-apertures and not only preventing the passage of the water and urine, but also causing them to overflow.

The present invention consists of a urinal having a narrow substantially vertical integral rib extending across the discharge-duct and into the bowl, so as to divide the duct into two parts and render it difficult, if not practically impossible, for waste matter to close both of them, all as illustrated upon the accompanying drawings, described in the following specification, and pointed out in the appended claim.

Reference is to be had to the accompanying drawings, forming a part hereof, and to the letters and figures of reference marked thereon, the same reference characters indicating the same parts or features wherever they occur.

Of the drawings, Figure 1 represents in vertical section a urinal embodying my invention. Fig. 2 represents a rear elevation of the same. Fig. 3 represents a section on line 3 3 of Fig. 1. Fig. 4 represents a perspective view of the bowl of the urinal.

Referring to the drawings, $a$ indicates the bowl of a siphon-jet urinal embodying the invention, although it will be understood that the latter may be equally well embodied in a urinal of any other type. Said bowl has a large front opening, the lower edge 5 of which is raised above the bottom 6 of the bowl. $b$ indicates the liquid-inlet duct, which communicates with a retarding-chamber $b'$, the lower end of said duct communicating with the outlet-passage. The said outlet-passage communicates with the bottom of the bowl through a large mouth 7, and it extends upwardly therefrom, as at 8, behind the back wall $c$ of the bowl, and above the lower edge of said wall communicating with a downwardly-extending passage 9, which terminates in a horizontal neck 10. The bowl $a$, back $c$, and outlet-passage 8 form a trap adapted to retain a body of water in position to seal the outlet-passage, as shown in Fig. 1. The passages 8 9 are arranged to form a siphon, of which the passage 9 is the longer leg, so that it will act to draw the water from the bowl.

The present invention consists of a rib $d$, extending across the mouth 7. This rib is substantially vertical and comparatively thin, so as not to obstruct the passage of liquid through the trap, and it is curved upwardly so as to project from the bottom into the bowl. Its ends are supported by the back wall $c$ of the bowl and the front wall 11 of the outlet-passage, with which they are integral.

When foreign matter is thrown into the bowl, it is held up from the bottom thereof by the rib and is prevented from being drawn entirely across the mouth 7, so as to close it. Even when paper is thrown into the bowl the rib holds it away from the mouth of the outlet and permits the discharge of the contents of the bowl beneath it. This rib not only holds away from the mouth of the outlet any paper or other pieces of flexible waste matter, but it permits the ends of any such pieces of paper that are caught by the rib to hang down on either side of the rib without obstructing the outflow to any degree, there being no small perforations on either side of the rib over which paper or other flexible substances can lie to obstruct such perforations.

Thus my invention provides a practically free outlet, permitting the passage of liquid and small solid objects, but effectually prevents the choking of the outlet and the consequent fouling and possible overflow of the urinal.

I claim—

A urinal having a bowl, an outlet from the bottom of said bowl, and a narrow substantially vertical integral rib having parallel sides and extending diametrically across the mouth of said outlet and raised above the bottom of the bowl.

In testimony whereof I have affixed my signature in presence of two witnesses.

GEORGE W. KNAPP.

Witnesses:
 MARCUS B. MAY,
 PETER W. PEZZETTI.